April 21, 1942.  W. A. VAN BERKEL  2,280,205
SLICING MACHINE
Filed March 7, 1938
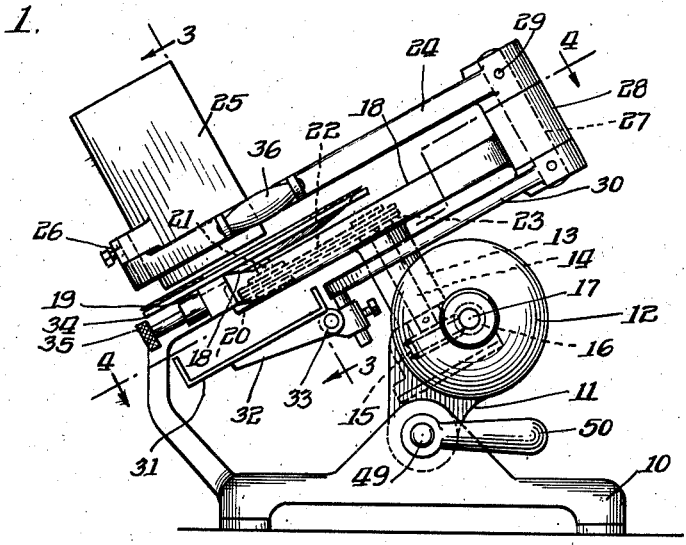
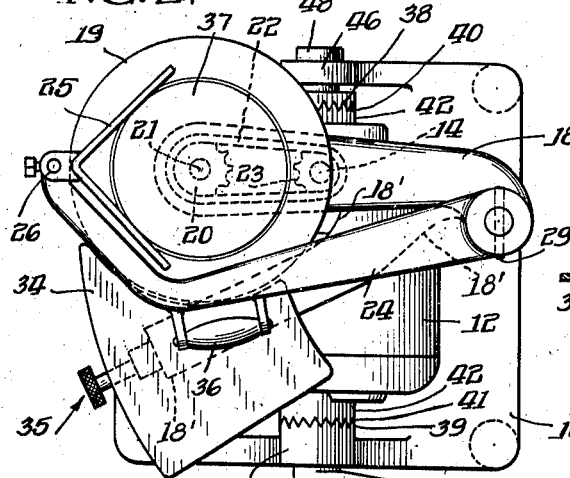
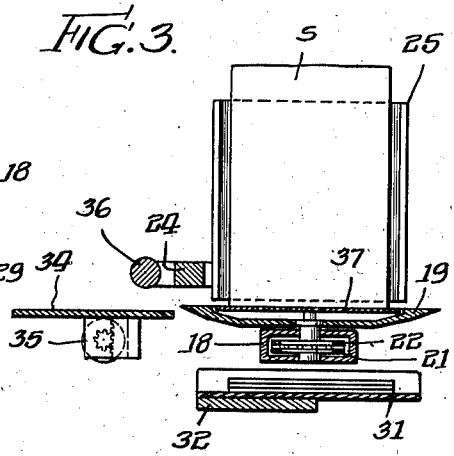
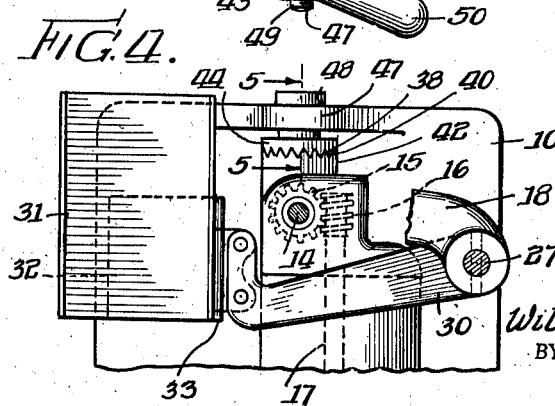
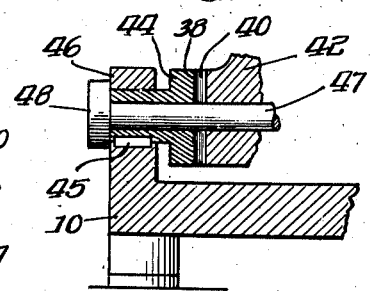
INVENTOR.
Wilhelmus Adrianus Van Berkel
BY Cox & Moore
ATTORNEYS.

Patented Apr. 21, 1942

2,280,205

UNITED STATES PATENT OFFICE 2,280,205

SLICING MACHINE

Wilhelmus Adrianus van Berkel, Clarens, Montreux, Switzerland, assignor to U. S. Slicing Machine Company, La Porte, Ind., a corporation of Indiana Application March 7, 1938, Serial No. 194,488
In Great Britain March 20, 1937

9 Claims. (Cl. 146—102)

This invention relates to slicing machines for slicing edible substances, such as meat, bread, vegetables and the like, and particularly to a slicing machine having a substance receiving tray for receiving the slices as they are cut from the substance.

More specifically, the invention relates to a slicing machine having a horizontally inclined slicing knife of the nature disclosed in applicant's co-pending application Serial No. 183,171, filed January 3, 1938, which became Patent No. 2,224,557 on December 10, 1940, but differs from said application in that the knife is not swingingly mounted as set forth in said application.

An important object of the present invention is the provision of a slicing machine whereby the substance is swung to and fro past a revolubly mounted but stationary knife, there being a slice receiver which is movable to and fro below the knife and in unison with the movement of the substance carrier.

A further object of the invention is the provision of a slicing machine which is adapted to be shifted to various positions, that is, the slicing machine and its co-operating and correlating parts may be swung on its pivot so that the machine can be moved from a substantially horizontal position to a nearly vertical position by the operation of simple means for locking the parts in locked position, there being a slice receiving tray movable in unison with the substance carrier past a stationary but revolubly mounted knife.

Numerous other objects and advantages will be apparent throughout the progress of the following specification.

The accompanying drawing illustrates a selected embodiment of the invention and the views therein are as follows:

Fig. 1 is a detail elevational view, partly in section, and embodying the invention;

Fig. 2 is a top plan view thereof;

Fig. 3 is a detail vertical sectional view on the line 3—3 of Fig. 1;

Fig. 4 is a detail plan section on the line 4—4 of Fig. 1; and

Fig. 5 is a detail sectional view on the line 5—5 of Fig. 4.

The particular slicing machine herein disclosed for the purpose of illustrating the invention comprises a base 10 upon which there is adjustably mounted a bracket 11 carrying an electric motor or other operating device 12. The bracket 11 carries a standard 13 in which there is mounted a driven shaft 14. The driven shaft 14 is driven by a gear 15 engaging a worm 16 on the motor shaft 17. A support 18 is rigidly connected to the housing or support 13 and comprises a supporting bracket for the revolubly mounted knife 19. The knife is driven by a gear 20 on the knife shaft 21 through the medium of a chain 22 which has operative connection with the gear 20 and with another gear 23 on the vertical shaft 14. The knife 19 is, therefore, stationary but revolubly mounted.

An arm 24 carries a substance supporting trough or chute 25 which is relatively V-shaped, as shown in Fig. 2, and has its guiding or supporting sides facing the knife axis 21. This chute or trough is provided with adjusting means 26 so that the chute or trough 25 may be adjusted vertically to accommodate substances of different sizes.

The arm 24 is rigid but is pivotally mounted on the arm or bracket 18, there being a shaft or axis 27 revolubly supported in the bearing 28 which is rigid with the member 18. The pin or shaft 27 is fixed to the arm 24 in any desirable manner, such as by a keyway or by a fastening member 29. A tray arm 30 is also fixed to the pin 27 and is arranged immediately below and parallel with the arm 24. The arm 24 and the arm 30 are therefore rigidly connected by means of the shaft or pivot 27 but are revolubly supported in the bearing 28. Therefore, movement of the arm 24 also moves the lower arm 30 in the same direction. A substance receiving tray 31 is operatively connected to the lower arm 30 and moves therewith.

The substance tray carries a fitting 32 which is attached to the arm 30 and permits vertical adjustment with respect to the arm 30. The fitting 32 may also be provided with a universal joint 33 so as to permit tilting action of the tray 31. If desired, this tilting action may be both lateral and transverse. Therefore, the tray may be tilted in any desired position and is also provided with vertical adjustment with respect to the arm 30. Inasmuch as the tray 31 is fixed to the lower arm 30, the tray will move to and fro along with the to and fro movement of the upper arm 24.

A gauge plate 34 is operatively secured to an arm 18' which is integrally secured to the arm 18, as clearly shown in Fig. 2 of the drawing. This gauge plate is adapted to be engaged by the substance in the trough 25. Adjusting means 35 operatively mounted in the arm 18' is provided to raise and lower the gauge plate with respect to the cutting edge of the knife so that slices of various thicknesses may be cut.

During operation the substance S is positioned in the chute or trough 25 with its bottom or lower end engaging the upper surface of the gauge plate 34, the gauge plate first being adjusted so as to set the device to cut slices of a predetermined thickness. The arm 24 is operated to and fro by manual movement applied to the handle 36 so that the substance will be drawn across the knife 19. The knife may be of the dished type and preferably countersunk to receive a guard plate 37 which is flush with the inside cutting edge of the knife, as clearly shown in Fig. 3. As the substance is moved across the knife a slice will be cut from the substance and deposited on the tray 31. The tray will always be in position to receive the slice as it is cut because the tray moves back and forth with the movement of the arm 24.

The inclination of the knife and its correlated elements is adapted to be increased or decreased, depending upon the substance being cut. Where relatively smooth, easy-sliding substances are to be cut, the inclination of the machine need not be very great; but in cases where a relatively sticky or hard-sliding substance is to be cut, the inclination should be increased. Therefore, means are provided for increasing the inclination or decreasing the inclination of the machine as desired. The means for permitting the adjustment and for locking the machine in adjusted position comprises outer toothed or serrated faces 38, 39 engaging inner serrated faces 40, 41, respectively. The inner serrated faces 40, 41 may be in a tubular, shiftable portion 42. The toothed or serrated portion 39, which engages the teeth or serrated portion 41, is preferably in the form of a boss 43 formed integrally with the frame 19. The serrated or toothed portion 38, however, is in the form of a bushing 44, Fig. 5. This bushing carries the teeth 38 on its inner side, to the right in Fig. 5, and is keyed at 45 to a lug or boss 46 formed on the frame 19. The bushing 44, therefore, has slidable movement but is restricted rotatively because of the keylock 45. A rod or bolt 47 passes through the member 42 and has its head 48 in engagement with the bushing 44, the head 48 being positioned exteriorly of the boss 46. The rod or bolt 47 has its outer end 49 threaded and extending through the boss or ear 43, as clearly shown in Fig. 2. A handle 50 in the form of a nut engages the threaded end 49 of the bolt 47 to lock the parts in adjusted position. When adjustment is desired, the handle 50 is rotated counter-clockwise to loosen the connections. The rotation must be sufficient, of course, to permit disengagement of the teeth 38, 40 and 39, 41. This loosening is permitted because of the slidable movement of the bushing which carries the teeth 38. Therefore, when the handle 50 is rotated counter-clockwise, the teeth are disengaged and the machine may be adjusted to any desired angular position. When the machine is in the desired position, the handle 50 is rotated clockwise to lock the parts in adjusted position.

The invention provides a slicing machine which is adjustable so as to provide a wide range of inclination or adjustability and is, therefore, capable of accommodating substances of various slidable characteristics. The slicing operation is performed by manually moving the substance in an arcuate path past a stationary and rotatable knife, and the slice receiving tray is so arranged and constructed that it will move with the to and fro movement of the substance.

The range of adjustment may be such as to embrace a setting in which the slicing plane is horizontal. In a machine having provision for such a range of adjustment, the substance carrier or chute 25 would preferably be arranged not perpendicular to the slicing plane (as shown in the drawing) but at such an inclination to the perpendicular that there would be no tendency for the substance to topple from the receiver when the structure was set with the slicing plane horizontal.

Change may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A slicing machine comprising a base, a horizontal pivot rod carried by the base, a supporting member carried by the pivot rod and having vertical pivotal movement throughout various angles about the pivot rod, co-operating locking means between the base and supporting member to lock and maintain the base and supporting member in adjusted position, a rotatable member to lock or release the co-operating locking means, a knife supporting frame rigid with the supporting member, a knife inclined to the horizontal revolubly mounted on the frame, an arm swingingly mounted on said frame above the knife, and a substance support carried by the arm.

2. A slicing machine comprising a base, a horizontal pivot rod carried by the base, a supporting member carried by the pivot rod and having vertical pivotal movement throughout various angles about the pivot rod, co-operating locking means between the base and supporting member to lock and maintain the base and supporting member in adjusted position, a rotatable member to lock or release the co-operating locking means, a knife supporting frame rigid with the supporting member, a knife inclined to the horizontal revolubly mounted on the frame, an arm swingingly mounted on said frame above the knife, a substance support carried by the arm, a second arm below said knife and rigidly connected to the first arm and movable therewith, and a slice receiving tray carried by the second arm.

3. A slicing machine comprising a base, opposed spaced lugs rigid with the base, a rod carried by the lugs, a supporting member pivotally mounted on the rod and having vertical arcuate movement throughout various angles about the rod, engageable locking teeth on a said lug and on said member to lock and maintain the member to a said lug in various adjusted positions, turnable means on the rod to lock or release the locking teeth, a knife supporting frame rigid with the supporting member, a knife rotatively mounted on the frame, an arm swingingly carried by the frame and arranged above the knife, and a substance support on the arm.

4. A slicing machine comprising a base, opposed spaced lugs rigid with the base, a rod carried by the lugs, a supporting member pivotally mounted on the rod and having vertical arcuate movement throughout various angles about the rod, engageable locking teeth on a said lug and on said member to lock the member to a said lug in various adjusted positions, turnable means on the rod to lock or release the locking teeth, a knife supporting frame rigid with the supporting member, a knife rotatably mounted on the frame, an arm swingingly carried by the frame and arranged above the knife, a substance support on the arm, a second arm below the knife and movable with the first named arm, and a substance support carried by the second arm.

5. A slicing machine comprising a base, opposed spaced lugs rigid with the base, a rod carried by the lugs, a supporting member pivotally mounted on the rod and having vertical arcuate movement throughout various angles about the rod, engageable locking teeth on a said lug and on said member to lock the member to a said lug in various adjusted positions, turnable means on the rod to lock or release the locking teeth, a knife supporting frame rigid with the supporting member, a knife rotatively mounted on the frame, an arm swingingly carried by the frame and arranged above the knife, a substance support on the arm, a second arm below the knife and movable with the first named arm, and a substance support adjustably and tiltably mounted on said second arm.

6. A slicing machine comprising a base, a horizontal pivot rod carried by the base, a supporting member carried by the pivot rod and having vertical pivotal movement throughout various angles about the pivot rod, cooperating locking means between the base and supporting member to lock and maintain the base and supporting member in adjusted position, a rotatable member to lock or release the cooperating locking means, a knife supporting frame rigid with the supporting member, a knife adapted to be inclined to the horizontal upon adjustment of said supporting means revolubly mounted on the frame, power drive means mounted on said supporting means, means carried by said supporting means and frame for operatively connecting said power drive means to said knife, an arm swingingly mounted on said frame above the knife, and a substance support carried by the arm.

7. A slicing machine comprising a base, a horizontal pivot rod carried by the base, a supporting member carried by the pivot rod and having vertical pivotal movement throughout various angles about the pivot rod, cooperating locking means between the base and supporting member to lock and maintain the base and supporting member in adjusted position, a rotatable member to lock or release the cooperating locking means, a knife supporting frame rigid with the supporting member, a knife adapted to be inclined to the horizontal upon adjustment of said supporting means revolubly mounted on the frame, power drive means mounted on said supporting means, a rotatable shaft extending upwardly through said supporting means, means including said rotatable shaft for operatively connecting said power drive means to said knife, an arm swingingly mounted on said frame above the knife, and a substance support carried by the arm.

8. A slicing machine comprising a base, a horizontal pivot rod carried by the base, a supporting member carried by the pivot rod and having vertical pivotal movement throughout various angles about the pivot rod, cooperating locking means between the base and supporting member to lock and maintain the base and supporting member in adjusted position, a rotatable member to lock or release the cooperating locking means, a knife supporting frame rigid with the supporting member, a knife adapted to be inclined to the horizontal upon adjustment of said supporting means revolubly mounted on the frame, power drive means mounted on said supporting means, means carried by said supporting means and frame for operatively connecting said power drive means to said knife, an arm swingingly mounted on said frame above the knife, a substance support carried by the arm, a second arm below said knife and rigidly connected to the first arm and movable therewith, and a slice receiving tray carried by the second arm.

9. A slicing machine comprising a base, opposed spaced lugs rigid with the base, a rod carried by the lugs, a supporting member pivotally mounted on the rod and having vertical arcuate movement throughout various angles about the rod, a pair of engageable locking teeth arranged adjacent each of said lugs and cooperating with the lugs and said member for locking and maintaining the member in various adjusted positions, common turnable means on the rod to lock or release both of said pairs of the locking teeth, a knife supporting frame rigid with the supporting member, a knife rotatively mounted on the frame, an arm swingingly carried by the frame and arranged above the knife, and a substance support on the arm.

WILHELMUS ADRIANUS van BERKEL.